United States Patent
Nakano et al.

(10) Patent No.: US 8,415,074 B2
(45) Date of Patent: Apr. 9, 2013

(54) NONAQUEOUS ELECTROLYTE BATTERY

(75) Inventors: Mitsuru Nakano, Nagoya (JP); Tohru Shiga, Okazaki (JP); Yoko Hase, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 1229 days.

(21) Appl. No.: 12/230,763

(22) Filed: Sep. 4, 2008

(65) Prior Publication Data

US 2009/0061315 A1 Mar. 5, 2009

(30) Foreign Application Priority Data

Sep. 4, 2007 (JP) ................................ 2007-229169
Jul. 9, 2008 (JP) ................................ 2008-178896

(51) Int. Cl.
*H01M 4/58* (2010.01)
*H01M 4/86* (2006.01)
*H01M 4/96* (2006.01)

(52) U.S. Cl. ..................... 429/531; 429/199; 429/218.1; 429/482

(58) Field of Classification Search ................ 429/199, 429/218.1, 482, 531
See application file for complete search history.

(56) References Cited

U.S. PATENT DOCUMENTS

| | | | |
|---|---|---|---|
| 2002/0106541 A1* | 8/2002 | Yamada et al. | 429/21 |
| 2003/0013003 A1* | 1/2003 | Hinokuma et al. | 429/40 |
| 2004/0115516 A1* | 6/2004 | Miyake et al. | 429/42 |

FOREIGN PATENT DOCUMENTS

| | | |
|---|---|---|
| JP | A-57-072272 | 5/1982 |
| JP | A-63-168973 | 7/1988 |
| JP | A-04-223049 | 8/1992 |
| JP | A-05-182653 | 7/1993 |
| JP | A-07-014617 | 1/1995 |
| JP | A-2003-007357 | 1/2003 |
| JP | A-2005-166685 | 6/2005 |
| JP | A-2006-286414 | 10/2006 |
| WO | WO 2006/078472 A2 | 7/2006 |

OTHER PUBLICATIONS

Hayashi et al., Synthesis and structural and electronic properties of the octaethylporphyrin-dihexylbithiophene-fullerene derivatives (OEP-DHBTh-C60) connected with diacetylene linkage, Oct. 2005, Tetrahedron Letters, 46, 6961-6965.*
Japanese Office Action dated Dec. 14, 2010 in Japanese Patent Application No. 2008-178896 (with translation).
Dec. 20, 2011 Office Action issued in Japanese Patent Application No. 2008-178896 (with English Translation).

* cited by examiner

*Primary Examiner* — Patrick Ryan
*Assistant Examiner* — Ladan Mohaddes
(74) *Attorney, Agent, or Firm* — Oliff & Berridge, PLC (57) ABSTRACT

A nonaqueous electrolyte battery includes a negative electrode composed of a metallic lithium foil and a positive electrode, the negative electrode and the positive electrode being arranged so as to face each other with an ion-conducting medium therebetween. The positive electrode is formed by a method in which a conductive agent and a binder are mixed, and then the mixture is press-formed onto a current collector. The ion-conducting medium contains, in addition to a lithium salt such as lithium hexafluorophosphate, a halogen such as iodine, and a halogen compound (e.g., lithium iodide). Furthermore, the positive electrode may contain a lithium halide.

9 Claims, 8 Drawing Sheets

EXAMPLE 9

FIG. 8

EXAMPLE 10

FIG. 9

EXAMPLE 11

FIG. 10

EXAMPLE 12

NONAQUEOUS ELECTROLYTE BATTERY

BACKGROUND OF THE INVENTION

1. Field of the Invention

The present invention relates to nonaqueous electrolyte batteries.

2. Description of the Related Art

In recent years, the market for portable information devices, such as mobile phones and electronic mail terminals, has been rapidly expanding. Furthermore, in view of environmental concerns and the energy crisis, there has been an increased interest in hybrid vehicles and electrical automobiles. Under these circumstances, there have been demands for high-energy electrical storage devices.

Lithium has a standard reduction potential of −3.05 V and is easily ionizable metal in the electrochemical series. That is, an electrical storage device having a negative electrode composed of lithium has a high operating voltage and a high level of energy. On the other hand, since lithium has the lowest atomic weight among metals, the theoretical capacity of lithium is very high at 3,862 mAh/g. Consequently, when lithium is used as a negative electrode, an electrical storage device having a high energy density can be obtained.

Meanwhile, metal/air batteries are known in which a metal is used as the negative electrode active material, and oxygen in air is used as the positive electrode active material. Since oxygen is supplied from the outside, the metal/air batteries can be high-capacity electrical storage devices. Air batteries in which lithium is combined with air are referred to as lithium/air batteries, and have been recently receiving attention as high-energy electrical storage devices (for example, Japanese Unexamined Patent Application Publication Nos. 2005-166685 and 2006-286414). For example, with respect to a lithium/air battery described in Japanese Unexamined Patent Application Publication No. 2005-166685, it is reported that when discharged at a current density of 0.5 MA/cm$^2$, a discharge capacity of about 10 to 15 mAh is achieved. Furthermore, magnesium/air batteries in which magnesium is used instead of lithium have also been proposed (for example, Japanese Unexamined Patent Application Publication No. 2003-7357). In such lithium/air batteries, the electrochemical reaction of oxygen occurs at the positive electrode, lithium peroxide and lithium oxide are generated during discharging, and these oxides are decomposed to produce oxygen gas during charging.

Furthermore, zinc/bromine batteries which are metal/halogen batteries and in which zinc is used as the negative electrode, and bromine is used as the positive electrode have been known for a long time (for example, Japanese Unexamined Patent Application Publication Nos. 7-14617, 5-182653, and 4-223049).

SUMMARY OF THE INVENTION

In the lithium/air batteries, although high energy capacity has been expected, it has been difficult to obtain high output. Furthermore, the zinc/bromine batteries are aqueous batteries and usually cannot have a potential equal to or higher than the water electrolysis voltage, and thus it has been difficult to achieve high capacity.

The present invention is intended to solve the problems described above, and it is a main object of the present invention to provide a nonaqueous electrolyte battery which has high capacity and high output.

In order to achieve the object described above, the present inventors have conducted diligent studies, including formation of a battery in which a carbon positive electrode and a negative electrode composed of metallic lithium are arranged with a nonaqueous electrolyte solution containing lithium ions and iodine therebetween, formation of a battery in which a carbon positive electrode containing lithium iodide and a negative electrode composed of metallic lithium are arranged with a nonaqueous electrolyte solution containing lithium ions therebetween, and formation of a battery in which a nonaqueous electrolyte solution contains lithium ions, iodine, and a iodine compound. In any of the batteries, it has been found that it is possible to realize an energy-storage device with high capacity and high output. Thus, the present invention has been achieved.

According to an aspect of the present invention, a nonaqueous electrolyte battery includes a negative electrode having a material which releases lithium ions as a negative electrode active material; an ion-conducting medium which is in contact with the negative electrode and conducts lithium ions; and a positive electrode having a material which generates battery reaction and the solubility of which in the ion-conducting medium is higher than that of oxygen as a positive electrode active material, the positive electrode being in contact with the ion-conducting medium.

In the nonaqueous electrolyte battery according to the aspect of the present invention, since the material which generates battery reaction and the solubility of which in the ion-conducting medium is higher than that of oxygen is used as the positive electrode active material instead of air in the known lithium/air batteries, it is possible to maintain high capacity and to perform high-current charging and discharging. The reason for obtaining such an effect is not clear, but is estimated as follows. For example, when metallic lithium is used as a negative electrode active material and iodine is used as a positive electrode active material, the charge/discharge reactions of the nonaqueous electrolyte battery according to the aspect of the present invention proceed as shown in formulae (1) to (3) below. By using iodine or the like the solubility of which in the ion-conducting medium is higher than that of oxygen, the function as the positive electrode active material improves, and high capacity and high output are achieved.

Formula (1)

Formula (2)

Formula (3)

In the nonaqueous electrolyte battery according to a first embodiment of the present invention, the ion-conducting medium may contain, as the positive electrode active material, at least one halogen selected from the group consisting of iodine, bromine, and chlorine.

In the nonaqueous electrolyte battery according to a second embodiment of the present invention, the positive electrode may contain at least one lithium halide selected from the group consisting of lithium iodide, lithium bromide, and lithium chloride.

In the nonaqueous electrolyte battery according to a third embodiment of the present invention, the ion-conducting medium may contain lithium ions and iodine as the positive electrode active material, and may further contain an iodine compound.

In the nonaqueous electrolyte battery according to the third embodiment of the present invention, as shown in formula (4) below, iodine and the iodine compound contained in the ion-conducting medium have a property of repeating the redox equilibrium reaction at a lithium standard potential of 3.53 V. Furthermore, since a part of lithium iodide generated on the positive electrode during discharging is dissolved again in the ion-conducting medium, it is believed that the charge/discharge reactions proceed while the concentrations of iodine and lithium iodide in formula (3) vary. Therefore, it is estimated that, when iodine and the iodine compound are contained in the ion-conducting medium, higher capacity and higher output can be achieved.

(Li standard 3.53V)  Formula (4)

DESCRIPTION OF THE PREFERRED EMBODIMENTS

A nonaqueous electrolyte battery of the present invention includes a negative electrode having a material which releases lithium ions as a negative electrode active material; an ion-conducting medium which is in contact with the negative electrode and conducts lithium ions; and a positive electrode having a material which generates battery reaction and the solubility of which in the ion-conducting medium is higher than that of oxygen as a positive electrode active material, the positive electrode being in contact with the ion-conducting medium. The positive electrode active material which generates battery reaction and the solubility of which in the ion-conducting medium is higher than that of oxygen may be, for example, at least one halogen selected from the group consisting of iodine, bromine, and chloride. Among these, iodine is preferred. The halogen as the positive electrode active material may be contained in at least one of the positive electrode and the ion-conducting medium. The ion-conducting medium may contain at least one halogen selected from the group consisting of iodine ($I_2$), bromine ($Br_2$), and chlorine ($Cl_2$). The positive electrode may contain at least one lithium halide selected from the group consisting of lithium iodide, lithium bromide, and lithium chloride. First to third embodiments of the present invention will be described below. In the nonaqueous electrolyte battery according to the first embodiment, the ion-conducting medium contains, as the positive electrode active material, at least one halogen selected from the group consisting of iodine, bromine, and chlorine. In the nonaqueous electrolyte battery according to the second embodiment, the positive electrode contains at least one lithium halide selected from the group consisting of lithium iodide, lithium bromide, and lithium chloride. In the nonaqueous electrolyte battery according to the third embodiment, the ion-conducting medium contains iodine as the positive electrode active material, and further contains an iodine compound.

First, the nonaqueous electrolyte battery according to the first embodiment of the present invention will be described.

In the nonaqueous electrolyte battery according to the first embodiment, the negative electrode contains, as the negative electrode active material, a material which occludes and releases lithium ions. Examples of the material which occludes and releases lithium ions include, in addition to metallic lithium and lithium alloys, metal oxides, metal sulfides, and carbonaceous materials which occlude and release lithium ions. Examples of the lithium alloys include alloys of lithium and metals, such as aluminum, silicon, tin, magnesium, indium, and calcium. Examples of the metal oxides include tin oxides, silicon oxides, lithium titanium oxides, niobium oxides, and tungsten oxides. Examples of the metal sulfides include tin sulfides and titanium sulfides. Examples of the carbonaceous materials which occlude and release lithium ions include graphites, cokes, mesophase pitch carbon fibers, spherical carbon, and resin-fired carbon materials.

In the nonaqueous electrolyte battery according to the first embodiment, the negative electrode may be formed, for example, by a method in which a negative electrode active material, a conductive agent, and a binder are mixed, an appropriate solvent is added to the mixture to form a negative electrode material in the form of a paste, the paste is applied to the surface of a current collector, followed by drying, and as necessary, compression is performed to increase the electrode density. As the conductive agent, any material having conductivity can be used without limitations. Examples of such a material include carbon blacks, such as Ketjenblack, acetylene black, channel black, furnace black, lampblack, and thermal black; graphites, such as natural graphite (e.g., flaky graphite), artificial graphite, and expanded graphite; conductive fibers, such as carbon fibers and metal fibers; metal powders, such as copper, silver, nickel, and aluminum; and organic conductive materials, such as polyphenylene derivatives. These may be used alone or in combination of two or more. Examples of the binder include, but are not limited to, thermoplastic resins and thermosetting resins. Specific examples thereof include polyethylene, polypropylene, polytetrafluoroethylene (PTFE), polyvinylidene fluoride (PVDF), styrene-butadiene rubber, tetrafluoroethylene-hexafluoroethylene copolymers, tetrafluoroethylenehexafluoropropylene (FEP) copolymers, tetrafluoroethylene-perfluoroalkylvinylether (PFA) copolymers, vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene (ECTFE) copolymers, vinylidene fluoride-hexafluoropropylene-tetrafluoroethylene copolymers, vinylidene fluoride-perfluoromethylvinylether-tetrafluoroethylene copolymers, and ethylene-acrylic acid copolymers. These may be used alone or in combination of two or more. As the solvent in which the negative electrode active material, the conductive agent, and the binder are dispersed, an organic solvent can be used. Examples of the organic solvent include N-methylpyrrolidone, dimethylformamide, dimethylacetamide, methyl ethyl ketone, cyclohexanone, methyl acetate, methyl acrylate, diethyl triamine, N,N-dimethylaminopropylamine, ethylene oxide, and tetrahydrofuran. Furthermore, a dispersant, a thickener, or the like may be added to water, and the active material may be formed into a slurry using a latex, such as SBR. Examples of the thickener that can be used include polysaccharides, such as carboxymethyl cellulose and methyl cellulose. These may be used alone or in combination of two or more. Examples of the application method include roller coating using an applicator roll, screen coating, a doctor blade process, spin coating, and bar coating. A desired thickness and shape can be achieved using any of these methods. As the current collector of the negative electrode, copper, nickel, stainless steel, titanium, platinum, fired carbon, a conductive polymer, conductive glass, or an Al—Cd alloy can be used. In order to improve adhesion, conductivity, and reduction resistance, it is also possible to use a material, such as copper, which is surface-treated with carbon, nickel, titanium, silver, or the like. The surface of such a material may be oxidized. The current collector may be in the form of a foil, a film, a sheet, a net, a punched or expanded body, a lath sheet, a porous body, a foamed body, and a molded body composed of a fiber group. The thickness of the current collector is, for example, in the range of 1 to 500 μm.

In the nonaqueous electrolyte battery according to the first embodiment, the positive electrode have, as a positive electrode active material, at least one halogen selected from the group consisting of iodine ($I_2$), bromine ($Br_2$), and chlorine ($Cl_2$). The positive electrode active material is supplied by the halogen dissolved in the electrolyte which will be described below. The positive electrode may be formed by a method in which predetermined amounts of a conductive agent and a binder are mixed, and then the mixture is press-formed onto a current collector. The mixture ratio between the conductive agent and the binder is not particularly limited. For example, the amount of the binder is 3 to 10 parts by weight relative to 100 parts by weight of the conductive agent. In this case, the conductive agent and the binder may be subjected to wet mixing in the presence of a solvent, such as N-methylpyrrolidone. Alternatively, dry mixing may be performed using a mortar or the like. As the conductive agent, the binder, the solvent, and the forming method used for the positive electrode, those exemplified above for the negative electrode can be used. The shape of the current collector may be the same as that of the negative electrode. The current collector used for the positive electrode is not particularly limited. For example, a metal plate or a metal mesh composed of stainless steel, aluminum, copper, nickel, or platinum can be used. Among these, platinum, aluminum, or stainless steel which is electrochemically stable is preferred. Furthermore, examples of the material for the current collector of the positive electrode include transparent conductive materials, such as $InSnO_2$, $SnO_2$, $ZnO$, and $In_2O_2$; and these materials doped with an impurity, such as fluorine-doped tin oxide ($SnO_2$:F), antimony-doped tin oxide ($SnO_2$:Sb), tin-doped indium oxide ($In_2O_3$:Sn), Al-doped zinc oxide (ZnO:Al), and Ga-doped zinc oxide. These materials may be used in a single layer or multiple layers disposed on a glass or polymer. The thickness of the layer or layers is preferably in the range of about 3 nm to 10 μm, although not particularly limited thereto. The surface of the glass or polymer may be flat or irregular.

Furthermore, the positive electrode may contain electrolytic manganese dioxide.

In the nonaqueous electrolyte battery according to the first embodiment, as the ion-conducting medium, for example, an electrolyte solution or gel electrolyte containing a supporting salt, or a solid electrolyte can be used, although not particularly limited thereto. As the supporting salt, for example, a known supporting salt, such as $LiPF_8$, $LiClO_4$, $LiBF_4$, or $Li(CF_3SO_2)_2N$, can be used, although not particularly limited thereto. Examples of the solvent for the electrolyte solution include, but are not limited to, organic solvents used for known secondary batteries or capacitors, such as ethylene carbonate (EC), propylene carbonate (PC), γ-butyrolactone (γ-BL), diethyl carbonate (DEC), and dimethyl carbonate (DMC), and mixtures of these solvents. It is also possible to use an ionic liquid, such as 1-methyl-3-propylimidazolium bis(trifluorosulfonyl)imide or 1-ethyl-3-butylimidazolium tetrafluoroborate. The concentration of the supporting salt is preferably 0.1 to 2.0 M, and more preferably 0.8 to 1.2 M. The gel electrolyte is not particularly limited. Examples of the gel electrolyte include a gel electrolyte in which an electrolyte solution containing a supporting salt is incorporated into a polymer, such as polyvinylidene fluoride, polyethylene glycol, or polyacrylonitrile, or a saccharide, such as an amino-acid derivative, or a sorbitol derivative. As the solid electrolyte, an inorganic solid electrolyte, an organic solid electrolyte, or the like can be used. As the inorganic solid electrolyte, for example, nitrides and oxyates of lithium are known. Examples include, in particular, $Li_4SiO_4$, $Li_4SiO_4$—LiI—LiOH, $xLi_3PO_4$-(1-x)$Li_4SiO_4$, $Li_2SiS_3$, $Li_3PO_4$—$Li_2S$—$SiS_2$, and phosphorus sulfide compounds. Examples of the organic solid electrolyte include polyethylene oxide, polypropylene oxide, polyvinyl alcohol, polyvinylidene fluoride, polyphosphazene, polyethylene sulfide, polyhexafluoropropylene, and derivatives of these compounds. These may be used alone or in combination of two or more.

In the nonaqueous electrolyte battery according to the first embodiment, the ion-conducting medium contains, together with lithium ions, at least one halogen selected from the group consisting of iodine, bromine, and chlorine. As the halogen which is dissolved in the ion-conducting medium, bromine or iodine is preferable. The reason for this is that, even when halogen gas is generated and discharged from the battery, bromine and iodine are less toxic than chlorine. Furthermore, iodine is particularly preferable. The reason for this is that, when iodine is used, relatively good cycling characteristics can be obtained. The concentration of the halogen dissolved in the ion-conducting medium is preferably 0.02 M or more and equal to or less than the saturated concentration, and more preferably 0.05 M or more and equal to or less than the saturated concentration. When the concentration of the halogen is 0.02 M or more, the function as the positive electrode active material can be fully exerted, which is desirable.

In the nonaqueous electrolyte battery according to the first embodiment, a separator may be provided between the negative electrode and the positive electrode. As the separator, any material having a composition which can sustain the usage of the nonaqueous electrolyte battery can be used without particular limitations. Examples of the material for the separator include polymer non-woven fabrics, such as a polypropylene non-woven fabric and a polyphenylene sulfide non-woven fabric, and microporous films composed of an olefin resin, such as polyethylene or polypropylene. These may be used alone or in combination.

Figure 1:
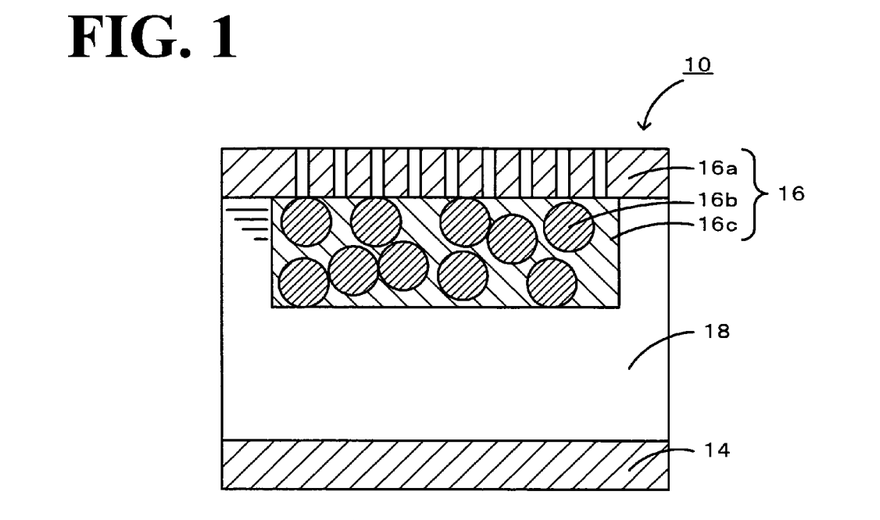
FIG. 1 is a schematic diagram of a nonaqueous electrolyte battery according to an embodiment of the present invention.

The shape of the nonaqueous electrolyte battery according to the first embodiment is not particularly limited. For example, the nonaqueous electrolyte battery may be in the form of a coin, a button, a sheet, a laminate, a cylinder, a flat shape, or a square shape. Furthermore, the nonaqueous electrolyte battery may be formed into a large size used for electrical automobiles, etc. An example of the nonaqueous electrolyte battery according to the first embodiment is schematically shown in FIG. 1. Referring to FIG. 1, in a nonaqueous electrolyte battery 10, a negative electrode 14 composed of a metallic lithium foil and a positive electrode 16 are arranged so as to face each other with an ion-conducting medium 18 therebetween. The positive electrode 16 is formed by a method in which a conductive agent 16b and a binder 16c are mixed, and then the mixture is press-formed onto a current collector 16a composed of a nickel mesh or the like. The ion-conducting medium 18 contains, in addition to a lithium salt such as lithium hexafluorophosphate, a halogen such as iodine.

The nonaqueous electrolyte battery according to the second embodiment of the present invention will now be described below.

In the nonaqueous electrolyte battery according to the second embodiment, the same negative electrode as that of the nonaqueous electrolyte battery according to the first embodiment can be used. Therefore, the descriptions thereof are omitted herein.

In the nonaqueous electrolyte battery according to the second embodiment, the positive electrode has, as a positive electrode active material, at least one halogen selected from the group consisting of iodine ($I_2$), bromine ($Br_2$), and chlorine ($Cl_2$). The positive electrode contains at least one lithium halide selected from the group consisting of lithium iodide, lithium bromide, and lithium chloride. The halogen ions of such a lithium halide release electrons during charging and are converted into a halogen, which is a positive electrode active material, and the halogen is dissolved in the ion-conducting medium. As the lithium halide contained in the positive electrode, lithium bromide or lithium iodide is preferable. The reason for this is that, even when halogen gas derived from the lithium halide is discharged from the battery, bromine and iodine are less toxic than chlorine. Furthermore, lithium iodide is particularly preferable. The reason for this is that, when lithium iodide is used, relatively good cycling characteristics can be obtained. The concentration of the lithium halide contained in the positive electrode is preferably in the range of 10% to 80% by weight. If the concentration of the lithium halide contained in the positive electrode is less than 10% by weight, a sufficient charge/discharge capacity cannot be obtained, which is undesirable. If the concentration of the lithium halide contained in the positive electrode exceeds 80% by weight, the relative amount of a conduction aid, such as carbon, contained in the positive electrode is decreased, a conduction path cannot be formed satisfactorily, and it is not possible to obtain a sufficient charge/discharge capacity and output characteristics, which is undesirable. The positive electrode may be formed by a method in which predetermined amounts of the lithium halide, a conductive agent, and a binder are mixed, and then the mixture is press-formed onto a current collector. The mixing ratio between the conductive agent and the binder is not particularly limited. For example, the amount of the binder is 3 to 10 parts by weight relative to 100 parts by weight of the conductive agent. In this case, the conductive agent and the binder may be subjected to wet mixing in the presence of a solvent, such as N-methylpyrrolidone. Alternatively, dry mixing may be performed using a mortar or the like. The same conductive agent, binder, and current collector as those of the nonaqueous electrolyte battery according to the first embodiment can be used, and therefore, the descriptions thereof are omitted herein.

Furthermore, the positive electrode may contain electrolytic manganese dioxide.

In the nonaqueous electrolyte battery according to the second embodiment, the same ion-conducting medium as that of the nonaqueous electrolyte battery according to the first embodiment can be used. Therefore, the descriptions thereof are omitted herein.

In the nonaqueous electrolyte battery according to the second embodiment, the same shape as that of the nonaqueous electrolyte battery according to the first embodiment can be used. Therefore, the descriptions thereof are omitted herein. The nonaqueous electrolyte battery according to the second embodiment can also have a structure shown in FIG. 1. Unlike the first embodiment, the positive electrode 16 is formed by a method in which, in addition to the conductive agent 16b and the binder 16c, a lithium halide, such as lithium iodide, is mixed, and then the mixture is press-formed onto the current collector 16a composed of a nickel mesh or the like. Furthermore, the ion-conducting medium 18 contains a lithium salt, such as lithium hexafluorophosphate, and may or may not contain a halogen, such as iodine.

The nonaqueous electrolyte battery according to the third embodiment of the present invention will now be described below.

In the nonaqueous electrolyte battery according to the third embodiment, the same negative electrode as that of the nonaqueous electrolyte battery according to the first embodiment can be used. Therefore, the descriptions thereof are omitted herein.

In the nonaqueous electrolyte battery according to the third embodiment, the same positive electrode as that of the nonaqueous electrolyte battery according to the first embodiment can be used. Therefore, the descriptions thereof are omitted herein. In the nonaqueous electrolyte battery according to the third embodiment, the positive electrode preferably contains a redox catalyst. The reason for this is that it is believed that the reduction of iodine, which is a positive electrode active material, is accelerated by the redox catalyst, and the function as the positive electrode active material is improved. As the redox catalyst, nickel, manganese dioxide, a fullerene derivative represented by formula (5), or the like can be used. Among these, the fullerene derivative is preferred. Such a fullerene derivative can be synthesized by a known method, for example, described in Journal of American Chemical Society, Vol. 115, p. 9798, 1993. In formula (5), n represents the number of pyrrolidinium groups bonded to Fu and is an integer of 1 to 8, and n can represent one value or two or more values. Fu may represent any one of fullerenes $C_{60}$, $C_{70}$, $C_{74}$, $C_{76}$, $C_{78}$, $C_{80}$, $C_{82}$, $C_{84}$, $C_{90}$, and $C_{96}$, or may be a mixture of two or more of these. Preferably, Fu represents fullerene $C_{60}$ from the standpoint of lowest production cost. $R^1$ and $R^2$ each independently represent a hydrogen atom or an alkyl group which may be branched. An alkyl group having 1 to 4 carbon atoms is preferable from the standpoint that the yield in the synthesis of the fullerene derivative is extremely low in the case where the number of carbon atoms of the alkyl group is 5 or more. A linear, not branched, alkyl group is preferable from the standpoint that the yield in the synthesis is high compared with the branched alkyl group. Examples of such an alkyl group include a methyl group, an ethyl group, an n-propyl group, and an n-butyl group. $X^-$ represents any one of a chlorine ion, a bromine ion, or an iodine ion. Among these, the iodine ion is preferred. Furthermore, the redox catalyst may be used for the positive electrode of the nonaqueous electrolyte battery according to the first or second embodiment described above.

Formula (5)

(In formula (5), n is an integer of 1 to 8, Fu represents at least one of fullerenes $C_{60}$, $C_{70}$, $C_{74}$, $C_{76}$, $C_{78}$, $C_{80}$, $C_{82}$, $C_{84}$, $C_{90}$, and $C_{96}$, $R^1$ and $R^2$ each independently represent a hydrogen atom or an alkyl group which may be branched, and $X^-$ represents any one of a chlorine ion, a bromine ion, or an iodine ion.)

In the nonaqueous electrolyte battery according to the third embodiment, the ion-conducting medium contains, together with lithium ions, iodine and an iodine compound. As the iodine compound contained in the ion-conducting medium, a metal iodide or an organic iodide may be used. Examples of the metal iodide include lithium iodide, potassium iodide, and nickel iodide. Among these, lithium iodide is preferred. Examples of the organic iodide include alkylimidazolium iodides, such as dimethylpropylimidazolium iodide, 1-methyl-3-propylimidazolium iodide, and 1-ethyl-3-butylimidazolium iodide; and alkylammonium iodides, such as tetrabutylammonium iodide. Preferably, the organic iodide contains one or two or more alkyl groups having 1 to 4 carbon atoms. In particular, as the iodine compound, lithium iodide, which is contained in a supporting salt and generated in the battery reaction, is more preferable. The amount of the iodine compound to be added is preferably in the range of 8% to 90% by weight in terms of the ratio of the iodine compound to iodine. In this range, the effect of addition of the iodine compound, which is shown in formula (4), can be sufficiently achieved, which is desirable. In the nonaqueous electrolyte battery according to the third embodiment, except for the above-mentioned condition, the same ion-conducting medium as that of the nonaqueous electrolyte battery according to the first embodiment can be used. Therefore, the descriptions thereof are omitted herein.

In the nonaqueous electrolyte battery according to the third embodiment, the same separator and shape of the nonaqueous electrolyte battery as those of the nonaqueous electrolyte battery according to the first embodiment can be used. Therefore, the descriptions thereof are omitted herein. Referring to FIG. 1, the ion-conducting medium 18 contains a lithium salt such as lithium hexafluorophosphate, a halogen such as iodine, and an iodine compound (lithium iodide). Furthermore, the positive electrode 16 may contain a redox catalyst which reduces iodine. The positive electrode 16 may be formed by mixing a lithium halide such as lithium iodide in addition to the conductive agent 16b and the binder 16c, or may be formed without mixing a lithium halide.

EXAMPLES

Specific examples of the present invention will be described below with reference to Examples. Examples 1 to 4 correspond to the specific examples of the nonaqueous electrolyte battery according to the first embodiment of the present invention, and Examples 5 to 7 correspond to the specific examples of the nonaqueous electrolyte battery according to the second embodiment of the present invention. Examples 8 to 13 correspond to the specific examples of the nonaqueous electrolyte battery according to the third embodiment of the present invention.

Example 1

A positive electrode was formed as described below. First, 100 mg of Ketjenblack (ECP-6000 manufactured by Mitsubishi Chemical Corporation), 10 mg of Teflon powder (manufactured by Daikin Industries, Ltd.; Teflon being a registered trademark), and 10 mg of electrolytic manganese dioxide (manufactured by Mitsui Mining Co., Ltd.) were dry-kneaded together using a mortar, and the formed into a sheet. Thus, a positive electrode member was obtained. The positive electrode member (6 mg) was pressure-bonded to a nickel mesh to form a positive electrode.

Figure 2:
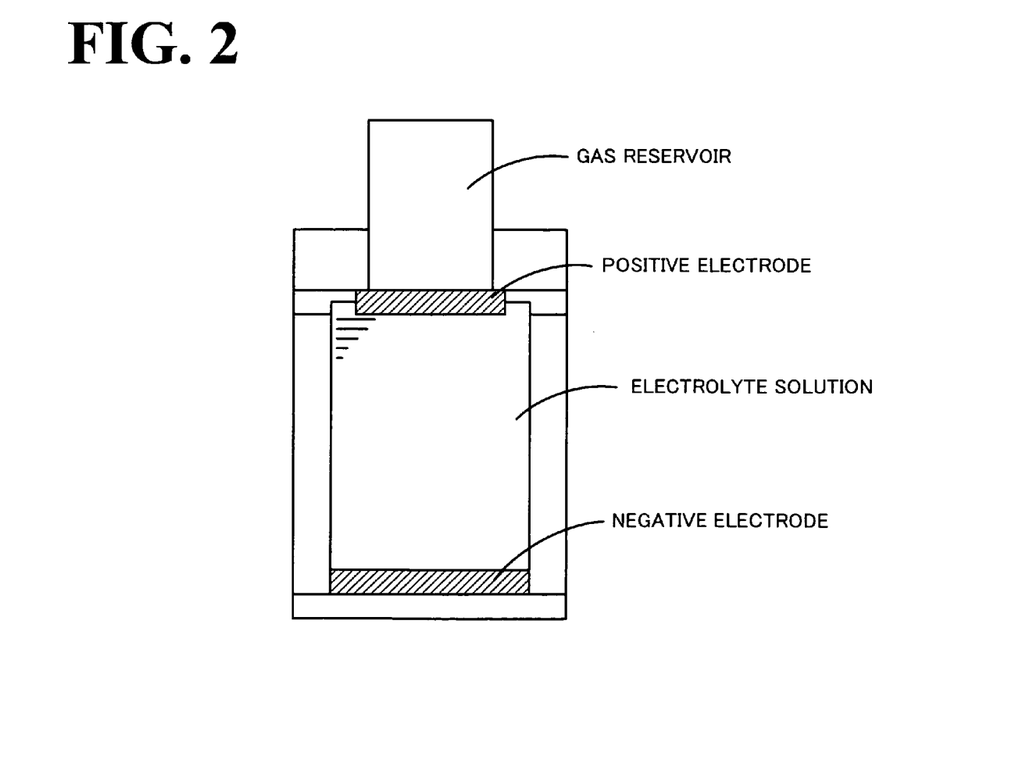
FIG. 2 is a schematic diagram of an F-type electrochemical cell.

As a negative electrode, metallic lithium (manufactured by Honjo Metal Co., Ltd.) with a diameter of 10 mm and a thickness of 0.5 mm was used. The positive electrode and the negative electrode were installed in an F-type electrochemical cell manufactured by Hokuto Denko Corp. (refer to FIG. 2) in a glove box under an atmosphere of argon, and 5 mL of an electrolyte solution prepared by dissolving 0.05 M iodine into a 1 M lithium hexafluorophosphate solution in a mixture of ethylene carbonate and diethyl carbonate (weight ratio 3:7; manufactured by Tomiyama Pure Chemical Industries, Ltd.) was poured into the cell. A gas reservoir of the F-type electrochemical cell was filled with argon, and thereby, a nonaqueous electrolyte battery was obtained. In the F-type electrochemical cell, the positive electrode and the negative electrode are electrically isolated from each other by a resin (not shown).

The F-type electrochemical cell thus fabricated was connected to a charge/discharge unit (Model HJ1001SM8A) manufactured by Hokuto Denko Corp. Discharging was performed by passing a constant current of 1.0 mA between the positive electrode and the negative electrode until the open-circuit voltage became 2.0 V, and then charging was performed until the open-circuit voltage became 4.2 V (this cycle was repeated twice). As a result, with respect to the charge/discharge capacity per weight of the positive electrode member, in the first cycle, the discharge capacity was 1,000 mAh/g, and the charge capacity was 12,000 mAh/g. In the second cycle, the discharge capacity was 9,000 mAh/g, and the charge capacity was 10,000 mAh/g. Table 1 summarizes Example 1, and Examples 2 to 4 and Comparative Example 1 which will be described below. Table 1 shows the positive electrode active material, the concentration of the positive electrode active material in the nonaqueous electrolyte solution, the catalyst in the positive electrode, the charge/discharge current, and the discharge capacity and the charge capacity in the first cycle.

TABLE 1

|  | Positive electrode active material (in electrolyte solution) | Concentration of positive electrode active material mol/L | Catalyst (in positive electrode) | Charge/ discharge current mA | Discharge capacity mAh/g | Charge capacity mAh/g |
|---|---|---|---|---|---|---|
| Example 1 | Iodine | 0.05 | Manganese dioxide | 1.0 | 1000 | 12000 |
| Example 2 | Iodine | 0.05 | Manganese dioxide | 0.1 | 1000 | 2100 |
| Example 3 | Iodine | 0.1 | Manganese dioxide | 1.0 | 2400 | 12100 |
| Example 4 | Bromine | 0.1 | Manganese dioxide | 1.0 | 2400 | 34000 |
| Comparative Example 1 | — | — | Manganese dioxide | 1.0 | 50 or less | 50 or less |

Example 2

A nonaqueous electrolyte battery was fabricated as in Example 1. In the nonaqueous electrolyte battery, discharging and charging were performed once under the same conditions as in Example 1 except that a charge/discharge current of 0.1 mA was used instead of 1.0 mA. As a result, with respect to the charge/discharge capacity per weight of the positive electrode member, the discharge capacity was 1,000 mAh/g, and the charge capacity was 2,100 mAh/g.

Example 3

A nonaqueous electrolyte battery was fabricated as in Example 2 except that the iodine concentration was set at 0.1 M instead of 0.05 M. In the nonaqueous electrolyte battery, discharging and charging were performed once under the same conditions as in Example 2. As a result, with respect to the charge/discharge capacity per weight of the positive electrode member, the discharge capacity was 2,400 mAh/g, and the charge capacity was 12,100 mAh/g.

Example 4

A nonaqueous electrolyte battery was fabricated as in Example 1 except that 0.1 M bromine was used instead of 0.05 M iodine. In the nonaqueous electrolyte battery, discharging and charging were performed once under the same conditions as in Example 1. As a result, with respect to the charge/discharge capacity per weight of the positive electrode member, the discharge capacity was 2,400 mAh/g, and the charge capacity was 34,000 mAh/g.

Example 5

A positive electrode was formed as described below. First, 100 mg of Ketjenblack (ECP-6000 manufactured by Mitsubishi Chemical Corporation), 10 mg of Teflon powder (manufactured by Daikin Industries, Ltd.; Teflon being a registered trademark), 10 mg of electrolytic manganese dioxide (manufactured by Mitsui Mining Co., Ltd.), and 100 mg of lithium iodide (manufactured by Aldrich Corp.) were dry-kneaded together using a mortar, and then formed into a sheet. Thus, a positive electrode member was obtained. The positive electrode member (6 mg) was pressure-bonded to a nickel mesh to form a positive electrode.

As a negative electrode, metallic lithium (manufactured by Tanaka Kikinzoku Kogyo) with a diameter of 10 mm and a thickness of 0.5 mm was used. The positive electrode and the negative electrode were installed in an F-type electrochemical cell manufactured by Hokuto Denko Corp. (refer to FIG. 2) in a glove box under an atmosphere of argon, and 5 mL of a 1 M lithium hexafluorophosphate solution in a mixture of ethylene carbonate and diethyl carbonate (weight ratio 3:7; manufactured by Tomiyama Pure Chemical Industries, Ltd.), as an electrolyte solution, was poured into the cell. A gas reservoir of the F-type electrochemical cell was filled with argon, and thereby, a nonaqueous electrolyte battery was obtained. In the F-type electrochemical cell, the positive electrode and the negative electrode are electrically isolated from each other by a resin (not shown).

Figure 3:
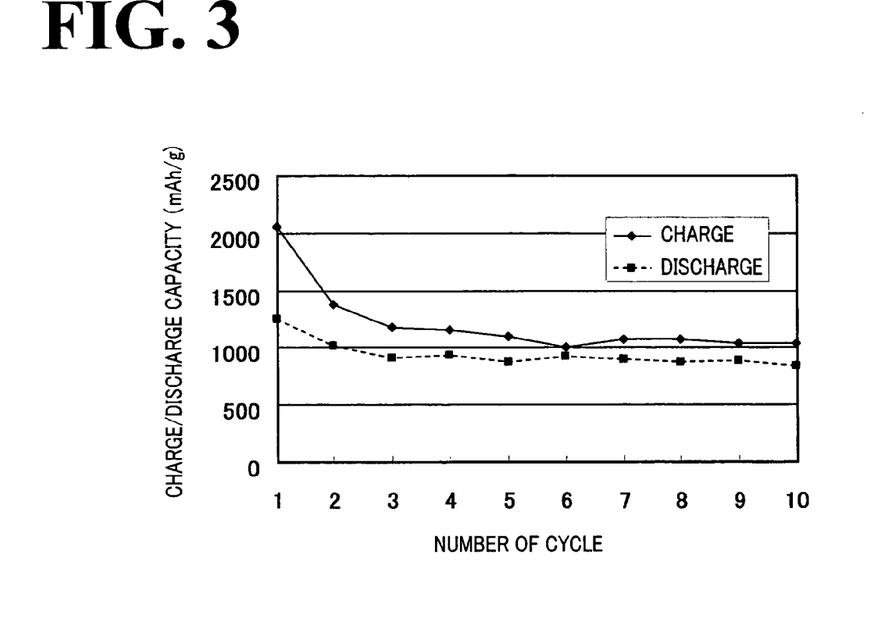
FIG. 3 is a graph showing the change in the charge/discharge capacity in Example 5.

The F-type electrochemical cell thus fabricated was connected to a charge/discharge unit (Model HJ1001SM8A) manufactured by Hokuto Denko Corp. Charging was performed by passing a constant current of 1.0 mA between the positive electrode and the negative electrode until the open-circuit voltage became 4.2 V, and then discharging was performed until the open-circuit voltage became 2.0 V. As a result, with respect to the charge/discharge capacity per weight of the positive electrode member, in the first cycle, the charge capacity was 2,000 mAh/g, and the discharge capacity was 1,300 mAh/g. Charging and discharging were repeated ten times. In the second and subsequent cycles, the charge/discharge capacity remained at about 1,000 mAh/g (refer to FIG. 3). Table 2 summarizes Example 5, and Examples 6 and 7 and Comparative Example 1 which will be described below. Table 2 shows the lithium halide containing the halogen as the positive electrode active material, the percent by weight of the positive electrode active material in the positive electrode, the catalyst in the positive electrode, and the charge capacity and the discharge capacity in the first cycle.

TABLE 2

|  | Positive electrode active material (added to positive electrode | Percent by weight of positive electrode active material | Catalyst (in positive electrode) | Charge capacity mAh/g | Discharge capacity mAh/g |
|---|---|---|---|---|---|
| Example 5 | Lithium iodide | 45 | Manganese dioxide | 2000 | 1300 |
| Example 6 | Lithium bromide | 45 | Manganese dioxide | 1900 | 1600 |

TABLE 2-continued

| | Positive electrode active material (added to positive electrode) | Percent by weight of positive electrode active material | Catalyst (in positive electrode) | Charge capacity mAh/g | Discharge capacity mAh/g |
|---|---|---|---|---|---|
| Example 7 | Lithium iodide | 45 | — | 2800 | 1500 |
| Comparative Example 1 | — | — | Manganese dioxide | 50 or less | 50 or less |

Example 6

A nonaqueous electrolyte battery was fabricated as in Example 5 except that 100 mg of lithium bromide (manufactured by Aldrich Corp.) was used instead of 100 mg of lithium iodide. In the nonaqueous electrolyte battery, charging and discharging were performed once under the same conditions as in Example 5. As a result, with respect to the charge/discharge capacity per weight of the positive electrode member, the charge capacity was 1,900 mAh/g, and the discharge capacity was 1,600 mAh/g.

Example 7

Figure 4:
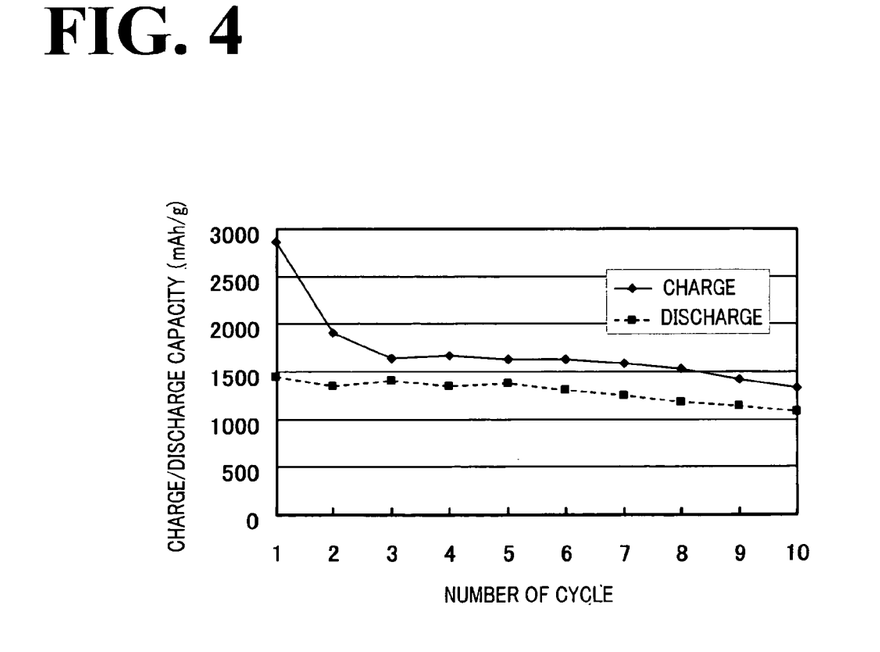
FIG. 4 is a graph showing the change in the charge/discharge capacity in Example 7.

A nonaqueous electrolyte battery was fabricated as in Example 5 except that electrolytic manganese dioxide was not added to the positive electrode member. In the nonaqueous electrolyte battery, charging and discharging were performed under the same conditions as in Example 5. As a result, with respect to the charge/discharge capacity per weight of the positive electrode member, in the first cycle, the charge capacity was 2,800 mAh/g, and the discharge capacity was 1,500 mAh/g. Charging and discharging were repeated ten times. In the second and subsequent cycles, the charge/discharge capacity remained in the range of about 1,000 to 1,600 mAh/g (refer to FIG. 4).

Comparative Example 1

A nonaqueous electrolyte battery was fabricated as in Example 1 except that 0.05 M iodine was not added to the electrolyte solution. In Comparative Example 1, it can also be described that a nonaqueous electrolyte battery was fabricated as in Example 5 except that lithium iodide was not added to the positive electrode. Therefore, Comparative Example 1 is a comparative example for Example 1 and also a comparative example for Example 5. In the nonaqueous electrolyte battery, charging was performed by passing a constant current of 1.0 mA between the positive electrode and the negative electrode until the open-circuit voltage became 4.2 V, and then discharging was performed until the open-circuit voltage became 2.0 V. As a result, the charge/discharge capacity per weight of the positive electrode member was 50 mAh/g at a maximum.

Example 8

Figure 5:
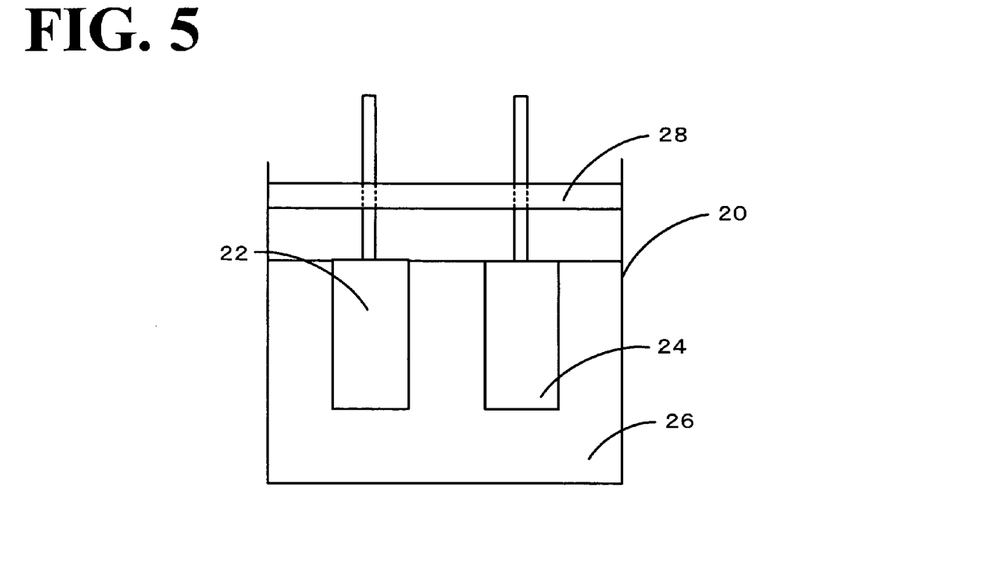
FIG. 5 is a schematic diagram of an evaluation cell.

A positive electrode was formed as described below. First, 146 mg of Ketjenblack (ECP-6000 manufactured by Mitsubishi Chemical Corporation) serving as a conductive agent, 12 mg of a Teflon binder (manufactured by Daikin Industries, Ltd.; Teflon being a registered trademark), and 10 mg of electrolytic manganese dioxide (manufactured by Mitsui Mining Co., Ltd.) serving as a redox catalyst were dry-kneaded together using a mortar, and then formed into a sheet. Thus, a positive electrode member was obtained. The positive electrode member (5 mg) was pressure-bonded to a lower portion (a region with a length of 10 mm and a width of 10 mm) of an electrochemically stable platinum mesh (manufactured by Nilaco) with a length of 20 mm and a width of 10 mm to form a positive electrode. Furthermore, as a negative electrode, 10-mm square metallic lithium (manufactured by Honjo Metal Co., Ltd.) with a thickness of 0.4 mm was used. An electrolyte solution serving as an ion-conducting medium was prepared by dissolving 0.22 g of iodine and 0.11 g (50% by weight relative to iodine) of lithium iodide (manufactured by Aldrich Corp.) into 15 ml of a 1M lithium perchlorate solution in a mixture of ethylene carbonate and diethyl carbonate (1:1) (manufactured by Tomiyama Pure Chemical Industries, Ltd.). An evaluation cell was fabricated as described below. First, as shown in FIG. 5, a positive electrode 22 and a negative electrode 24 were installed in a beaker cell 20 in a glove box under an atmosphere of argon, and 15 ml of an electrolyte solution 26 was poured into the beaker cell 20. Then, a plastic cover 28 was fixed on an opening of the beaker cell 20, and the beaker cell 20 was sealed. Thereby, the evaluation cell in Example 8 was obtained. The beaker cell 20 had a volume of about 30 ml.

Figure 6:
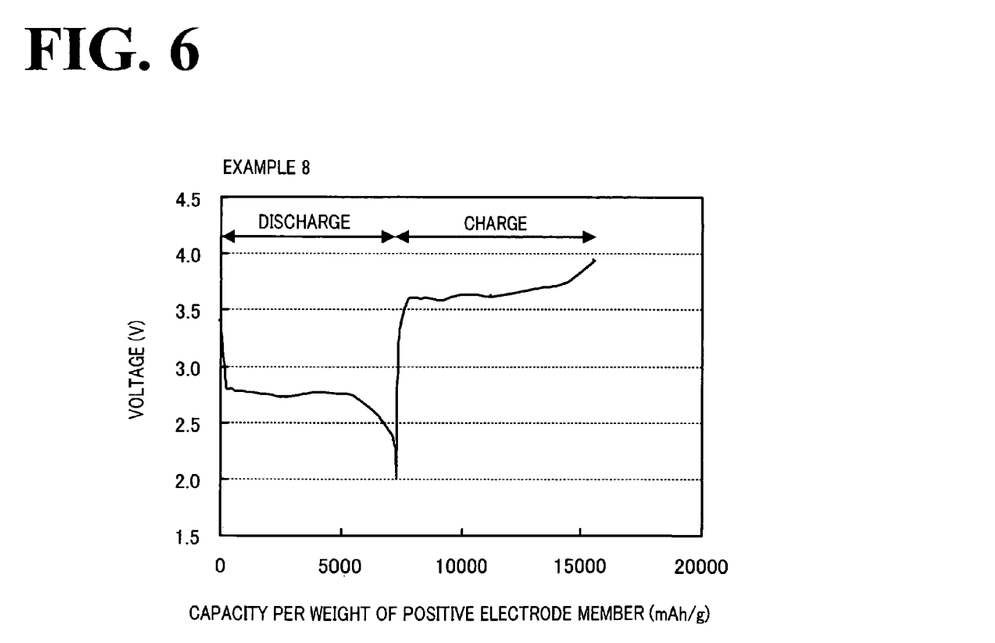
FIG. 6 is a graph showing the change in the discharge capacity and charge capacity in Example 8.

The evaluation cell thus fabricated was connected to a charge/discharge unit (Model HJ1001SM8A) manufactured by Hokuto Denko Corp. The measurement temperature was set at 25° C., and discharging was performed by passing a current of 0.5 mA (100 mA/g for the positive electrode member) between the positive electrode and the negative electrode until the open-circuit voltage became 2 V. Then, a reverse current of 0.25 mA was applied, and charging was performed until the open-circuit voltage became 4 V. FIG. 6 is a graph showing the change in the discharge capacity and charge capacity, in which the vertical axis represents the voltage (V), and the horizontal axis represents the change in charge/discharge capacity per weight of the positive electrode member. As shown in FIG. 6, in the nonaqueous electrolyte battery of Example 8, when the discharge current was 0.5 mA, the discharge capacity per weight of the positive electrode member was 7,270 mAh/g. When the charge current was 0.25 mA, the charge capacity per weight of the positive electrode member was 8,322 mAh/g. High output and high capacity were obtained in comparison with Example 14, which will be described later, in which no lithium iodide was added. Table 3 below shows the measurement results of Example 8 and Examples 9 to 14 which will be described below. The reason for the differences in the measurement results between Examples 1 to 7/Comparative Example 1 and Examples 8 to 14 is assumed that, in the former case, the nickel mesh of the current collector was involved in the charge/discharge reactions. As is evident from the results, it is preferable to use an electrochemically stable material (e.g., platinum) for the current collector of the positive electrode.

TABLE 3

| | Iodine compound | Ratio of iodine compound to iodine % | Catalyst | Discharge capacity mAh/g | Charge capacity mAh/g |
|---|---|---|---|---|---|
| Example 8 | Lithium iodide | 50.0 | Manganese dioxide | 7270 | 8322 |
| Example 9 | Lithium iodide | 9.1 | Manganese dioxide | 10890 | 6070 |
| Example 10 | Lithium iodide | 86.4 | Manganese dioxide | 14470 | 9870 |
| Example 11 | Dimethylpropylimidazolium iodide | 25.4 | Manganese dioxide | 9630 | 2870 |
| Example 12 | Lithium iodide | 50.0 | Iodine-containing fullerene derivative | 13200 | 8000 |
| Example 13 | Nickel iodide | 10.4 | Manganese dioxide | 1990 | 950 |
| Example 14 | — | 0 | Manganese dioxide | 1290 | 1340 |

Example 9

Figure 7:
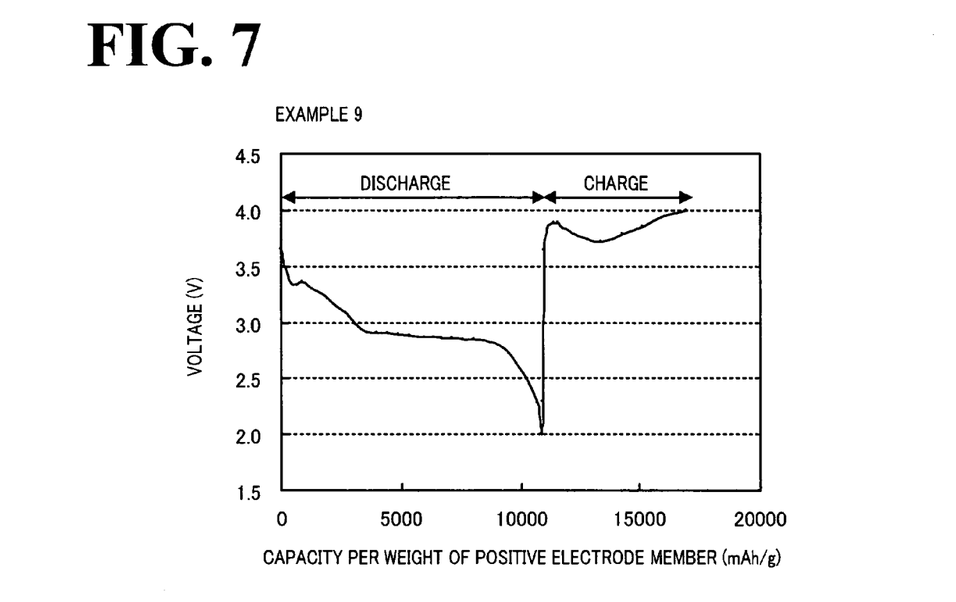
FIG. 7 is a graph showing the change in the discharge capacity and charge capacity in Example 9.

A nonaqueous electrolyte battery was fabricated as in Example 8 except that the amount of lithium iodide contained in the ion-conducting medium was set at 0.02 g (9.1% by weight relative to iodine). In Example 9, the same charge/discharge test as in Example 8 was carried out. As a result, as shown in FIG. 7, the discharge capacity per weight of the positive electrode member was 10,890 mAh/g, and the charge capacity was 6,070 mAh/g.

Example 10

Figure 8:
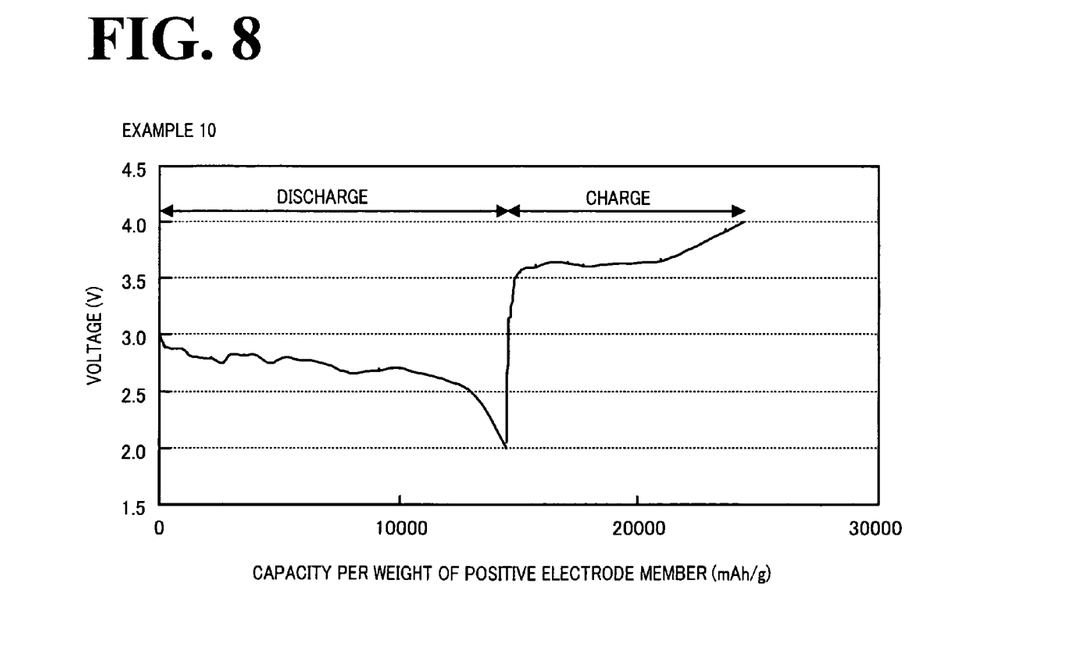
FIG. 8 is a graph showing the change in the discharge capacity and charge capacity in Example 10.

A nonaqueous electrolyte battery was fabricated as in Example 8 except that the amount of lithium iodide contained in the ion-conducting medium was set at 0.19 g (86.4% by weight relative to iodine). In Example 10, the same charge/discharge test as in Example 8 was carried out. As a result, as shown in FIG. 8, the discharge capacity per weight of the positive electrode member was 14,470 mAh/g, and the charge capacity was 9,870 mAh/g.

Example 11

Figure 9:
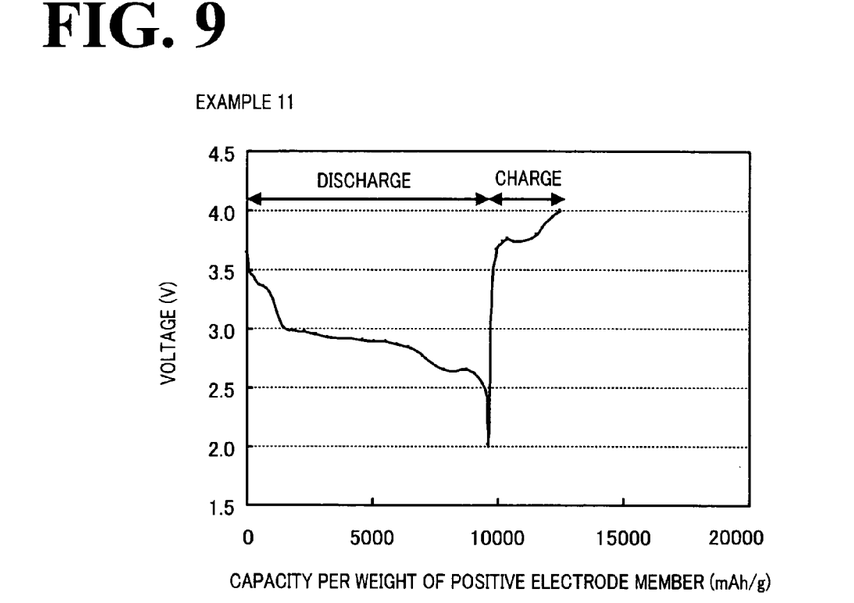
FIG. 9 is a graph showing the change in the discharge capacity and charge capacity in Example 11.

A nonaqueous electrolyte battery was fabricated as in Example 8 except that, instead of lithium iodide contained in the ion-conducting medium, 0.056 g (25.4% by weight relative to iodine) of dimethylpropylimidazolium iodide was used. In Example 11, the same charge/discharge test as in Example 8 was carried out. As a result, as shown in FIG. 9, the discharge capacity per weight of the positive electrode member was 9,630 mAh/g, and the charge capacity was 2,870 mAh/g.

Example 12

Figure 10:
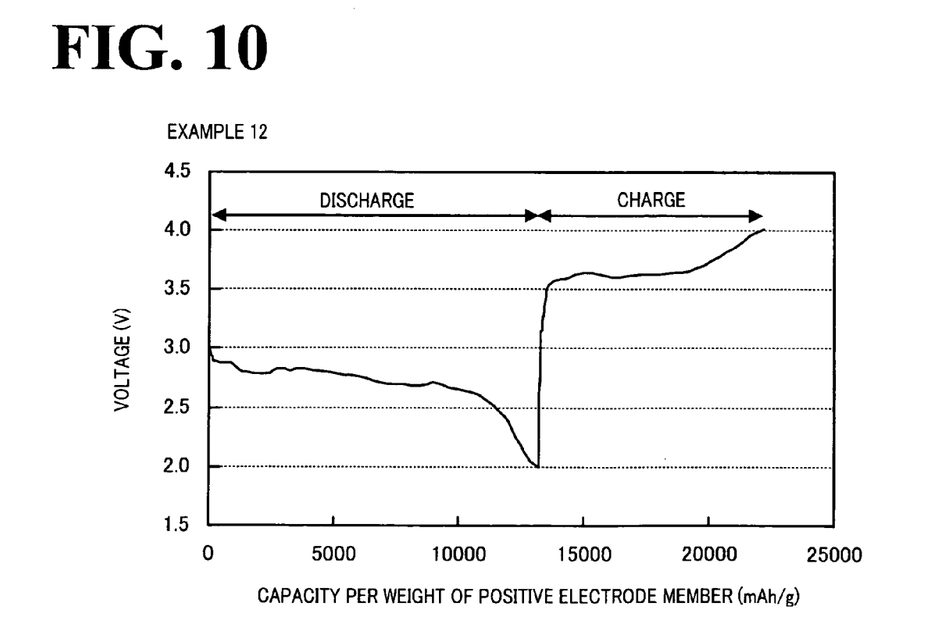
FIG. 10 is a graph showing the change in the discharge capacity and charge capacity in Example 12.
Figure 11:
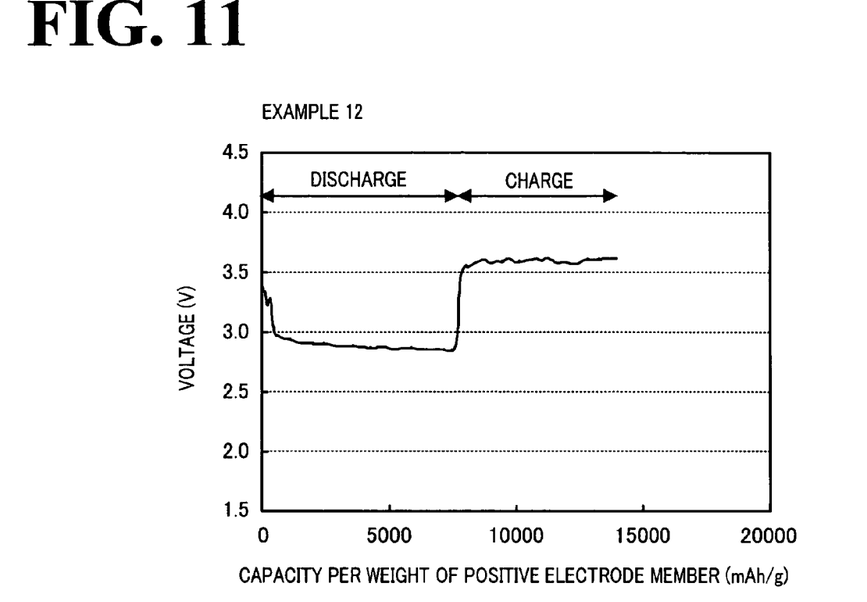
FIG. 11 is a graph showing the change in the capacity in constant volume discharging to 7,500 mAh/g and constant volume charging to 6,500 mAh/g.

A nonaqueous electrolyte battery was fabricated as in Example 8 except that, instead of manganese dioxide as the redox catalyst contained in the ion-conducting medium, 45 mg of an iodine-containing fullerene derivative represented by formula (6) (i.e., formula (5) in which $R^1$ and $R^2$ are each $CH_3$, n is 1, $X^-$ is $I^-$, and Fu is $C_{60}$ fullerene) was used. In Example 12, the same charge/discharge test as in Example 8 was carried out. As a result, as shown in FIG. 10, the discharge capacity per weight of the positive electrode member was 13,200 mAh/g, and the charge capacity was 8,000 mAh/g. Furthermore, in Example 12, a constant capacity discharge to 7,500 mAh/g and a constant capacity charge to 6,500 mAh/g were performed, the results of which are shown in FIG. 11. As is evident from FIG. 11, when the range of charge/discharge is set, the charge/discharge of the battery can be performed at a relatively stable voltage.

Formula (6)

Example 13

Figure 12:
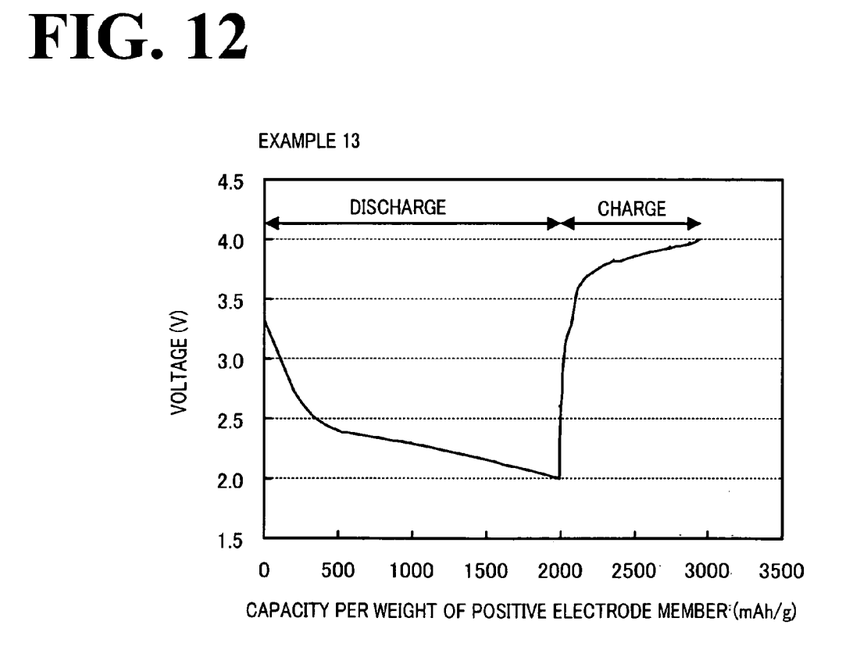
FIG. 12 is a graph showing the change in the discharge capacity and charge capacity in Example 13.

A nonaqueous electrolyte battery was fabricated as in Example 8 except that, instead of lithium iodide contained in the ion-conducting medium, 0.023 g (10.4% by weight relative to iodine) of nickel iodide was used. In Example 13, the same charge/discharge test as in Example 8 was carried out. As a result, as shown in FIG. 12, the discharge capacity per weight of the positive electrode member was 1,990 mAh/g, and the charge capacity was 950 mAh/g.

Figure 13:
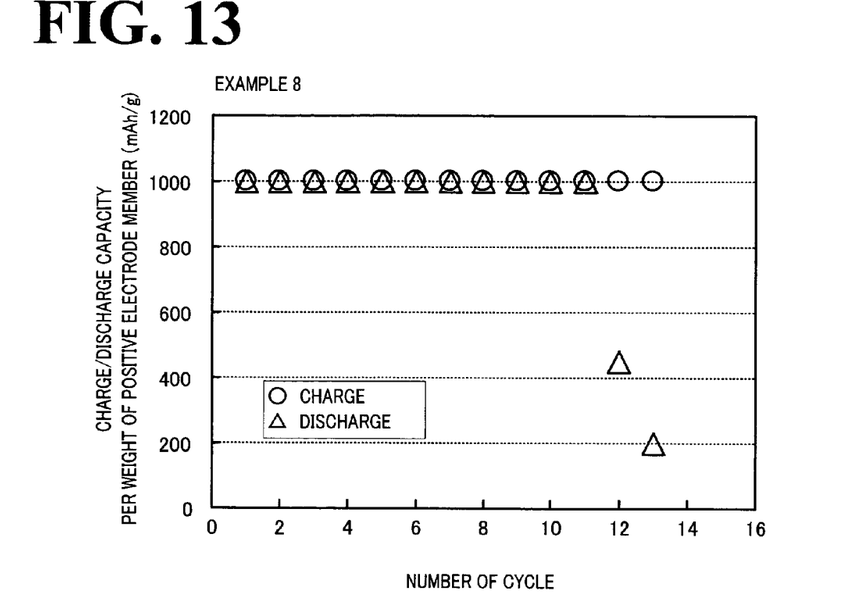
FIG. 13 is a graph showing the results of a charge-discharge cycling test in Example 8.
Figure 14:
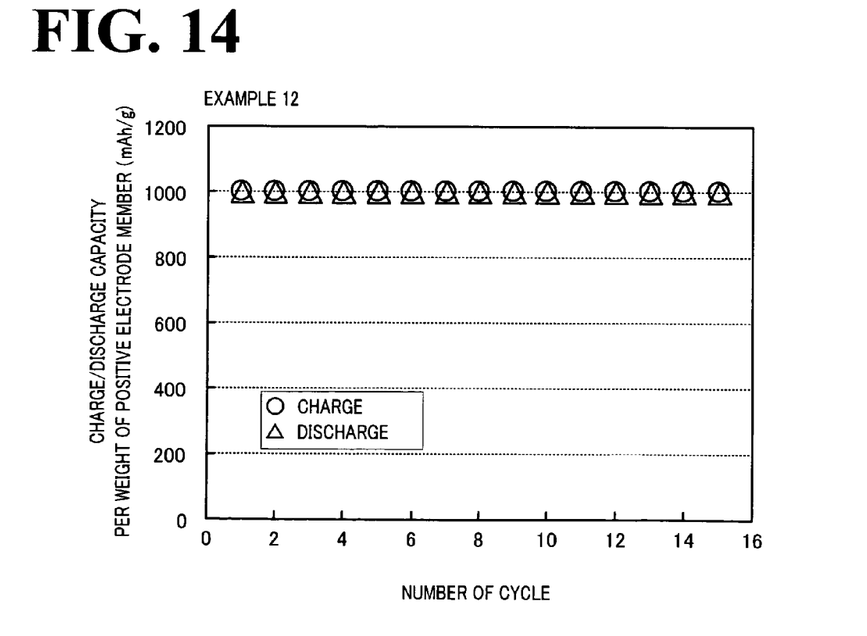
FIG. 14 is a graph showing the results of a charge-discharge cycling test in Example 12.

Furthermore, using the nonaqueous electrolyte batteries of Examples 8 and 12, charge-discharge cycling tests were carried out in which a constant capacity discharge to 1,000 mAh/g and a constant capacity charge to 1,000 mAh/g were repeated. FIG. 13 shows the measurement results in the charge-discharge cycling test for Example 8, and FIG. 14 shows the measurement results in the charge-discharge cycling test for Example 12. As is evident from FIGS. 13 and 14, Examples 8 and 12 exhibit excellent charge/discharge cycling performance.

Example 14

Figure 15:
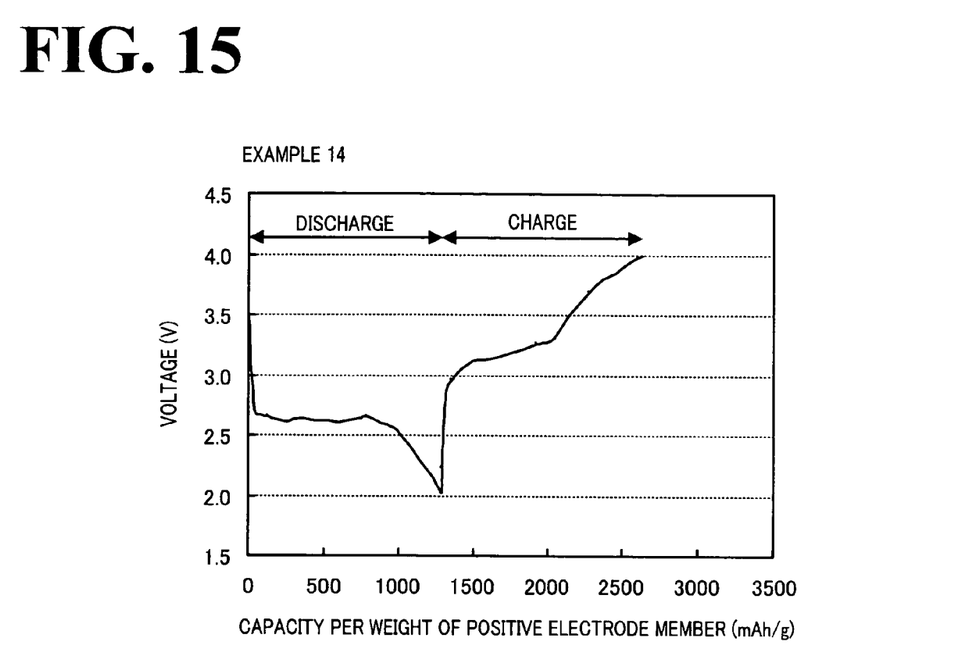
FIG. 15 is a graph showing the change in the discharge capacity and charge capacity in Example 14.

A nonaqueous electrolyte battery was fabricated as in Example 8 except that the amount of lithium iodide contained in the ion-conducting medium was set at 0 g (i.e., no lithium iodide was contained). Example 14 corresponds to a nonaqueous electrolyte battery according to the first embodiment of the present invention in which an electrochemically stable current collector for the positive electrode is used. In Example 14, the same charge/discharge test as in Example 8 was carried out. As a result, as shown in FIG. 15, the discharge capacity per weight of the positive electrode member was 1,290 mAh/g, and the charge capacity was 1,340 mAh/g.

This application claims the benefit of Japanese Patent Application No. 2007-229169 filed on Sep. 4, 2007 and No. 2008-178896 filed on Jul. 9, 2008, which are hereby incorporated by reference herein in their entirety, including the specification, drawings, and claims.

What is claimed is:

1. A nonaqueous electrolyte battery comprising:
a negative electrode having a material that releases lithium ions as a negative electrode active material;
an ion-conducting medium that is in contact with the negative electrode and conducts lithium ions; and
a positive electrode having a positive electrode material that generates a battery reaction and has a solubility in the ion-conducting medium that is higher than that of oxygen, the positive electrode being in contact with the ion-conducting medium, and containing a fullerene derivative as a redox catalyst, wherein
the fullerene derivative is represented by the following formula:

wherein n is an integer of 1 to 8,
Fu represents at least one of fullerenes $C_{60}$, $C_{70}$, $C_{74}$, $C_{76}$, $C_{78}$, $C_{80}$, $C_{82}$, $C_{84}$, $C_{90}$, or $C_{96}$,
$R^1$ and $R^2$ each independently represent a hydrogen atom or an alkyl group, which may be branched, and
$X^-$ represents any one of a chlorine ion, a bromine ion, or an iodine ion.

2. The nonaqueous electrolyte battery according to claim 1, wherein the ion-conducting medium contains a positive electrode active material having at least one halogen selected from the group consisting of iodine, bromine, and chlorine.

3. The nonaqueous electrolyte battery according to claim 2, wherein the concentration of the halogen contained in the ion-conducting medium is 0.05 M or more and equal to or less than a saturated concentration.

4. The nonaqueous electrolyte battery according to claim 1, wherein the ion-conducting medium contains iodine as the positive electrode active material and further contains an iodine compound.

5. The nonaqueous electrolyte battery according to claim 4, wherein the ion-conducting medium contains, as the iodine compound, at least one selected from the group consisting of lithium iodide, potassium iodide, nickel iodide, alkylimidazolium iodides, and alkylammonium iodides.

6. The nonaqueous electrolyte battery according to claim 4, wherein, in the ion-conducting medium, the ratio of the iodine compound to the iodine is in a range of 8% to 90% by weight.

7. The nonaqueous electrolyte battery according to claim 1, wherein the positive electrode contains at least one lithium halide selected from the group consisting of lithium iodide, lithium bromide, and lithium chloride.

8. The nonaqueous electrolyte battery according to claim 7, wherein the concentration of the lithium halide contained in the positive electrode is in a range of 10% to 80% by weight.

9. The nonaqueous electrolyte battery according to claim 1, wherein the positive electrode active material is at least one halogen selected from the group consisting of iodine, bromine, and chlorine.

* * * * *